Figure 1:
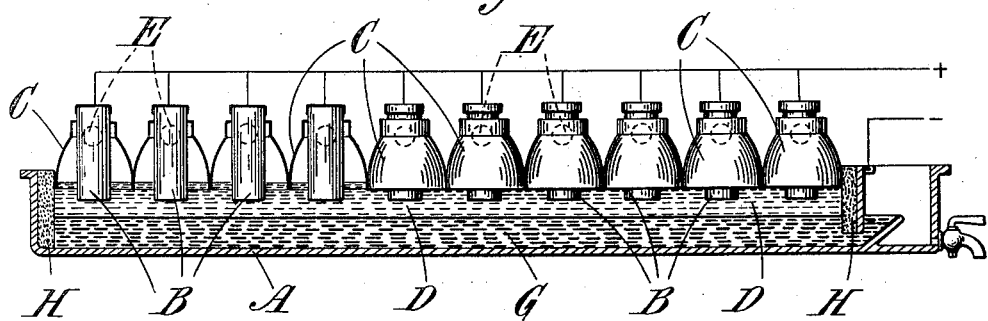

E. A. ASHCROFT.
SEPARATION OF METALS FROM ZINC BEARING ORES OR COMPOUNDS.
APPLICATION FILED APR. 25, 1912.

1,091,269.

Patented Mar. 24, 1914.

Witnesses
G. P. Kramer
C. S. Brown

Inventor:
Edgar Arthur Ashcroft
by Foster, Freeman, Watson & Coit
Attorneys

UNITED STATES PATENT OFFICE.

EDGAR ARTHUR ASHCROFT, OF BALESTRAND, SOGN, NORWAY.

SEPARATION OF METALS FROM ZINC-BEARING ORES OR COMPOUNDS.

1,091,269.  Specification of Letters Patent.  Patented Mar. 24, 1914.

Application filed April 25, 1912. Serial No. 693,150.

*To all whom it may concern:*

Be it known that I, EDGAR ARTHUR ASHCROFT, a subject of the King of England, residing at Balestrand, Sogn, Norway, have invented certain new and useful Improvements in Separation of Metals from Zinc-Bearing Ores or Compounds, of which the following is a specification.

The invention has special reference to the more economical treatment of zinc bearing sulfid ores or concentrates or residues or of solutions of chlorid, sulfate or other salts of zinc such as may be produced from such material by various known ways. Also to improvements in the electrolytic separation of zinc from the fused salts resulting from such operations and to the production of various by-products.

The invention is especially characterized by the employment of ammonia to precipitate the metals present, for instance, in a chlorid solution, as hydrates (which affords a ready means of obtaining the zinc separated from other metals such as iron, aluminum, Calcium, manganese and the like) and after separation of the superfluous metals and salts heating the zinc hydrate with ammonium chlorid to form pure fused zinc chlorid and recover the ammonia; also by the recovery of various by-products not heretofore available in this art.

A further improvement consists in more perfectly dehydrating the fused zinc chlorid before it is electrolyzed by passing in a stream of chlorin at about 500° C. or higher temperature for a short time with or without reduction of atmospheric pressure. And further improvements relate to the method of electrolysis and apparatus therefor all as more fully set out hereafter.

This invention may very conveniently be worked in conjunction with the three processes described in my U. S. Patents Nos. 1011897, 1011898 and 1011899 granted to me wherein are described improved processes for treatment of various well-known zinc bearing ores each process being more suitable for a certain class of material.

The present invention has a wider scope of utility and may be applied to every kind of zinc bearing ores, residues, concentrates or solutions from which it is desired to obtain zinc or lead in metallic form with simultaneous recovery of by-products metallic or otherwise.

In operating my improved process I proceed as follows:—

Step 1.

Whatever the nature of the raw material worked upon such of the zinc as is not readily obtainable as pure fused anhydrous chlorid by purification and decantation in the fused state (without the treatment herein described) is preferably first brought into crude solution in the form of chlorid of zinc. For instance—

*Example 1.*—A calamin slime, roasted ore or zinky residue is dissolved by preference in hydrochloric acid and crude solutions of any desired strength may be readily thus obtained and the insolubles rejected.

*Example 2.*—A zinc sulfid concentrate or ore carrying Zn 40%, Pb 10%, Ag. 10 ozs. per ton S 25%, Fe 10%, Mn 2%, gangue 5%, may be treated preferably—first for elimination of lead and silver by process described in my U. S. Patent No. 1011897, and then by chlorin smelting with or without the process in the second converter for elimination of iron and manganese all as described in my U. S. Patent No. 1011899, and finally the impure melt consisting of zinc chlorid and various other chlorids, such as alumina and calcium (with iron and manganese when the second converter process has not been applied and small percentages of lead chlorid when the deleading process has been omitted or incompletely applied) is dissolved in water and the insolubles rejected. In most cases when a material of constant or nearly constant composition is being treated this solution will be treated cyclically as hereafter described and only the wash waters derived from washing the filtered off insolubles and by-products need be added to make up the bulk of solution lost by partial evaporation in the final operation described below. The solution will be employed near to its boiling point at all parts of the cycle and its temperature will be maintained by the continual supplies of hot material poured into it from the converters and by the ammoniacal reactions. Such solutions will usually carry permanently large quantities of ammonium chlorid from which supplies of that salt will be drawn off or crystallized out from time to time for the final reaction described below. The insolubles (silicious gangue, etc.) are rejected after the first solution. In working with this class of ores it is very convenient and economical to employ the sulfur gases escaping from the converters directly for the production of a by-product of ammonium sulfate or sulfite or mixtures of these salts for which extensive uses are found in agriculture. For this purpose it is only necessary to admit air or oxygen to burn the sulfur to $SO_2$ which may then be combined with ammonia gas and water (preferably produced by the well-known reactions of calcium cyanamid or dicyandiamid with water etc.), either with or without previous oxidization of the sulfur to liquid $H_2SO_4$. The method I prefer for this purpose is to admit abundant air to the gases escaping from the top of the converter and after cooling the resulting gases to about 200° C. to admit ammonia gas and a small quantity of water vapor and after reaction again cool, which results in the direct and very economical production of a pure white salt mainly consisting of sulfate of ammonium in a high state of purity and very convenient physical condition. This salt has a high percentage of $NH_3$ (25% to 30%) and is a most valuable agricultural dressing in great demand.

Step 2.

Having obtained a crude solution of zinc chlorid containing for example $ZnCl_2$ 136 grams per liter and $NH_4Cl$ 265 grams per liter with iron, manganese and other metal chlorids in proportion to the zinc brought into solution at each cycle of operations, any known purifying process may be employed to eliminate undesirable elements from the neutral solution but I prefer to proceed as follows:—Ammonia gas is passed into the zinc bearing solution (or ammonia solution in water added thereto) until all the metals are precipitated as hydrates with corresponding formation of $NH_4Cl$ (type reaction $MCl_2+2NH_3+2H_2O=M(OH)_2+2NH_4Cl$). Excess of ammonia is then added until the hydrates soluble in ammoniacal solution, in this case mainly zinc (and lead if present) are dissolved. In the presence of ammonium chlorid some manganese will also be dissolved in the ammoniacal solution and may be readily precipitated therefrom (after filtering off the iron hydrates) by a slow stream of chlorin. In this way the ferric and manganic hydrates are obtained separately and in a high state of purity which gives them a special value as by-products. For instance the ferric hydrate so obtained produces a high quality of vermilion paint after roasting.

Step 3.

The whole of the zinc may be readily obtained from these purified ammoniacal solutions in the form of zinc hydrate $(Zn(OH)_2)$ by merely driving off the excess of ammonia by heat or by neutralizing it with a further proportion of zinc chlorid in purified neutral solution or by an acid with formation of ammonium salts (preferably chlorid). The following reactions are typical of this part of the process.

*On heating alone.*

(1) 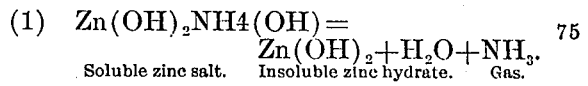
   Soluble zinc salt.   Insoluble zinc hydrate.   Gas.

*Precipitation by neutral zinc chlorid solution.*

(2) 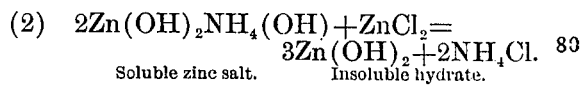
   Soluble zinc salt.   Insoluble hydrate.

*Precipitation by an acid.*

(3) 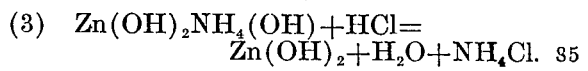

The zinc solutions can be of any desired strength for these reactions which are not affected by the degree of concentration or by excess of ammonium chlorid if present.

The moist zinc hydrate may be collected and drained of excess moisture and used directly in the following steps. Crystallized ammonium chlorid or a nearly saturated solution of the same being similarly treated in conjunction.

Step 4.

Finally the ammonium chlorid so formed (in molecular proportions or excess) is added to the precipitated zinc hydrate either as a concentrated solution (in which the presence of some zinc chlorid is of course in no way detrimental so long as the total ammonium chlorid is in excess of that required for the reaction given below) or as crystallized salt or in any other form and the mixture is slowly distilled in suitable vessels (for instance large enameled iron or glass retorts) at a low temperature first to drive off water and then rising to about 300° C. when all the zinc present will be converted to fused zinc chlorid and the ammonia will be driven off and may be recovered in any convenient way for use again. This reaction is as follows:—

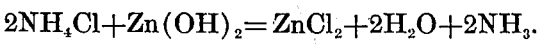

It is not necessary to previously dry the zinc hydrate or the ammonium chlorid. Any water remaining is driven off with the ammonia as well as the water produced by the reaction and at the end of the reaction the temperature is raised to about 500° C., which will drive off all the excess of $NH_4Cl$ which happens to be present. While still at this temperature it is preferable to pass in a slow stream of chlorin for some hours which will result in a pure, water-free, and neutral zinc chlorid very suitable for electrolysis by the following improved system. To further aid this process of eliminating water as well as during the disengagement of ammonia, it is convenient (but not imperative) to produce a partial vacuum over the charge in the retort which is easily accomplished by means of a small pump from which the gases are discharged into the absorbing apparatus. The escaping ammonia and water from the retorts as well as the small quantity of chlorin employed in the finishing process and any excess of ammonium chlorid present may in this way be conveniently passed back to the working solution thus allowing a minimum of apparatus to be employed and minimum handling of materials. The resulting zinc chlorid is a product of high purity practically free from ammonium chlorid and from water and is eminently suitable for electrolysis in the fused state. Lead chlorid if present in the solutions will be found also in the final melt but in no way interferes with the reactions or with the final treatment.

Step 5.

*Electrolytic treatment of fused chlorid.*— To insure the most economical electrolytic arrangement it is preferable to heat the metal cathode from below while only a short gap and a thin layer of fused chlorid is maintained over the surface thereof. A current density of about 3 amperes per square centimeter of exposed anode surface may be used and 2.5 volts per vat will suffice under these conditions. The temperature is best kept at 450° C. In order to heat the vat from below without destroying the metal vessels, I prefer to employ a bath of molten lead as cathode which may be drawn off and renewed frequently, or circulated continuously while the zinc alloy accumulates therein. The zinc on standing floats to the top and the lead sinks to the bottom and it is well known that a separation of lead from zinc or zinc from lead sufficient for nearly all commercial purposes can be readily made in a simple furnace in this manner. This arrangement has the further advantage that either zinc chlorid or lead chlorid or both at once can be decomposed in the same apparatus so that it becomes quite unnecessary to direct special attention to the complete separation of lead in the earlier stages of the treatment of an ore. It will be sufficient in fact to extract the silver content of a leady zinc concentrate and perhaps two-thirds of the lead by the deleading process U. S. Patent No. 1011897. The remainder of the lead will pass through the converter and the solutions and appear again in the final product of the electrolytic vats to which also the lead chlorid recovered from the deleading process may conveniently be added for recovery of lead and chlorin.

The form of electrolytic vat preferred for carrying this invention into effect is shown in the accompanying drawing in which—

Figure 2:
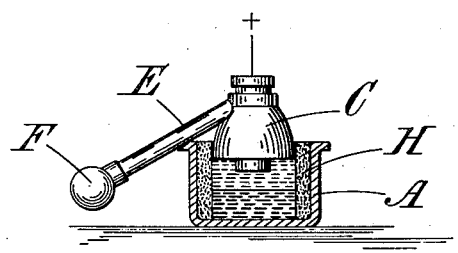

Figure 1 is a sectional elevation of the vat, and Fig. 2 is an end elevation partly in section.

The vat (say for the employment of 5,000 to 10,000 amperes per unit) is constructed in the form of a long trough A furnished with a number of parallel graphite anodes B of convenient dimensions say 10 of 300 square centimeters exposed surface area (say cylinders of 20 centimeters diameter). Around each of these anodes is placed an inverted bell C, constructed of any suitable material, such as hard glass or enameled iron, in order to recover the chlorin undiluted with air; the rim of the bell just dipping into the electrolyte D and leaving a marginal space of fused electrolyte open to the air for feeding the vat with fresh chlorids or for cleaning or other manipulation. A convenient pipe E conducts chlorin from each bell to the stationary chlorin mains F leading to the pumps and converters. The bells are made capable of ready removal and replacement in case of breakage or for the purpose of removing the deposits of zinc chlorid which are found thereon from time to time (having been carried off from the hot electrolyte with the escaping gases and condensed on the nearest cold surface).

G is the cathode of molten lead.

Preferably the vat A is lined on all sides with a fireclay lining H. The lining extends to the bottom of the vat but does not extend thereover. The working of this apparatus is very perfect, a current efficiency of 85% may be readily obtained and quite pure chlorin gases collected. The latter is of course used in the converters or may be applied to any other purpose. The production of zinc is 2.5 tons, of lead 10.0 tons per electric horse power which is greater than by any hitherto known process of either electric smelting or electrolysis.

The four examples given above of course only describe leading or typical lines of procedure which may be varied in a great variety of ways without departing from the spirit of this invention.

The above process as a whole and in its various parts presents great economical advantages among which may be briefly stated the following:—1. Complete cyclic working is obtained without the employment of a secondary electrolytic device or a secondary converter arrangement. 2. Several valuable by-products are directly produced in marketable form. 3. Very low total consumption of electric energy. 4. Complete recoveries of metals. 5. Complete recovery of chlorin. 6. Small and inexpensive apparatus. 7. Total avoidance of the expensive item of boiling down solutions of zinc chlorid to the fused state. 8. Small wear and tear of apparatus, all the solutions, etc., being basic except for the final fusion electrolysis which is neutral and the converter for which special imperishable material may be readily employed.

What I claim as my invention and desire to secure by Letters Patent is:—

1. The herein described process for obtaining metals from solutions of various metallic salts produced from zinc bearing sulfid ores which consists in precipitating the metals other than zinc and manganese from such solutions by the addition of an excess of ammonia, separating the precipitated hydrates from the solution, precipitating the manganese and separating it from the remaining solution, precipitating the zinc hydrate from the purified solution and re-acting it with ammonium chlorid at a temperature sufficient to convert the zinc into the fused chlorid and to drive off the ammonia.

2. The herein described process for obtaining metals from solutions of various metallic salts produced from zinc-bearing sulfid ores which consists in precipitating the metals as hydrates with ammonia, adding excess of ammonia to dissolve the zinc, lead, manganese and other hydrates present soluble in excess, separating the precipitated hydrates from the solution, precipitating the manganese by a slow stream of chlorin and separating it from the remaining solution, precipitating the zinc hydrate by adding to the solution a further quantity of purified zinc chlorid and reacting the zinc hydrate with ammonium chlorid at a temperature sufficient to convert the said zinc hydrate into fused chlorid and to drive off the ammonia.

3. The herein described process for obtaining metals from solutions containing them which consists in precipitating the metals as hydrates with ammonia, adding excess of ammonia to dissolve the zinc, lead, manganese, and other hydrates present soluble in excess, separating the precipitated hydrates from the solution, precipitating the manganese by a slow stream of chlorin and separating it from the remaining solution, precipitating the zinc hydrate by adding to the solution a further quantity of purified zinc chlorid, mixing with the precipitated zinc hydrate the ammonium chlorid separated from the solution by crystallization, thereafter distilling the mixture firstly at a low temperature to drive off the water, secondly at about 300° C. to convert the zinc to fused zinc chlorid, and to drive off the ammonia, recovering the ammonia, and thirdly raising the temperature to about 500° C. to drive off the excess of ammonium chlorid.

In testimony whereof I have signed my name to this specification in the presence of two subscribing witnesses.

EDGAR ARTHUR ASHCROFT.

Witnesses:
 PAUL ARRAS,
 CLÄRE SIMON.